United States Patent
Sarkis

(10) Patent No.: US 9,329,404 B1
(45) Date of Patent: May 3, 2016

(54) COMINATION JEWELRY PIECE WITH CAMOUFLAGED EYEGLASS MOUNT

(71) Applicant: Betinaz Sarkis, Los Alamitos, CA (US)

(72) Inventor: Betinaz Sarkis, Los Alamitos, CA (US)

( * ) Notice: Subject to any disclaimer, the term of this patent is extended or adjusted under 35 U.S.C. 154(b) by 0 days.

(21) Appl. No.: 14/547,539

(22) Filed: Nov. 19, 2014

(51) Int. Cl.
| | |
|---|---|
| *G02C 5/00* | (2006.01) |
| *A44C 15/00* | (2006.01) |
| *G02C 11/02* | (2006.01) |
| *A44C 5/00* | (2006.01) |

(52) U.S. Cl.
CPC .............. *G02C 5/008* (2013.01); *A44C 5/0007* (2013.01); *A44C 15/005* (2013.01); *G02C 11/02* (2013.01)

(58) Field of Classification Search
CPC ........ G02C 11/02; G02C 5/006; G02C 5/008; A44C 15/00; A44C 15/0005; A44C 15/003; A44C 5/0007
USPC ............. 351/51, 158; 63/1.11; D16/300, 306, D16/323
See application file for complete search history.

(56) References Cited

U.S. PATENT DOCUMENTS

| | | | |
|---|---|---|---|
| 703,725 A | 7/1902 | Hardinge | |
| 778,403 A | 12/1904 | Cline | |
| 3,389,406 A * | 6/1968 | Mitchell | A61F 9/025 2/12 |
| 3,774,998 A | 11/1973 | Kise | |
| 4,720,186 A * | 1/1988 | Douillard | G02C 5/006 351/114 |
| 4,893,917 A * | 1/1990 | Ebata | G02C 5/00 351/113 |
| D338,114 S | 8/1993 | Morin | |
| 5,448,317 A | 9/1995 | Huang | |
| D406,857 S | 3/1999 | Silvestri | |
| 5,929,966 A | 7/1999 | Conner | |
| 7,287,851 B2 | 10/2007 | Amioka | |
| 7,347,544 B1 | 3/2008 | McLaughlin | |
| D565,633 S | 4/2008 | Doolan | |
| 8,096,652 B1 * | 1/2012 | Carbone | G02C 3/003 351/124 |
| 8,556,413 B2 | 10/2013 | Hogan | |
| D703,725 S | 4/2014 | Keller et al. | |
| D704,763 S | 5/2014 | Keller et al. | |
| 8,752,743 B2 | 6/2014 | Nazarenko et al. | |
| 8,840,244 B2 | 9/2014 | Terry | |
| 8,894,200 B2 | 11/2014 | Jirsa et al. | |
| 2008/0231796 A1 | 9/2008 | Zoullas et al. | |
| 2009/0135369 A1 * | 5/2009 | Burnstein | G02C 11/02 351/52 |
| 2009/0225272 A1 | 9/2009 | Stewart | |
| 2011/0037939 A1 | 2/2011 | Pulvino et al. | |
| 2012/0038877 A1 | 2/2012 | Burns et al. | |
| 2012/0255326 A1 | 10/2012 | Prestwidge | |
| 2013/0321759 A1 | 12/2013 | Allen | |
| 2014/0063440 A1 * | 3/2014 | Butler | G02C 5/008 351/114 |

FOREIGN PATENT DOCUMENTS

CH             668491 A5      12/1998

* cited by examiner

*Primary Examiner* — Darryl J Collins
(74) *Attorney, Agent, or Firm* — Fulwider Patton LLP

(57) ABSTRACT

A U-shaped resilient jewelry band configured with a pair of legs to be retained around a wearer's neck, wrist or the like and including a pair of lenses in the closed extremity of the band, the band further being constructed so the legs will act as temples to retain the band on the wearer's head with the lenses in confronting relationship with the wearer's eyes. A pair visors carried from the respective legs to be selectively shifted between covering relationship over the lenses and retracted uncovering relationship to the wearer can view through the lenses.

18 Claims, 3 Drawing Sheets

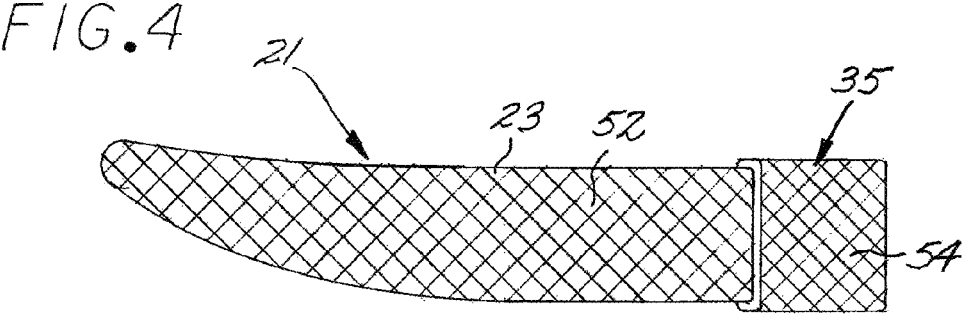
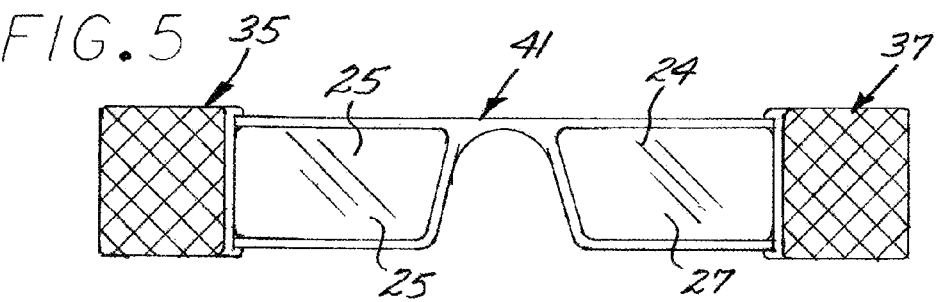
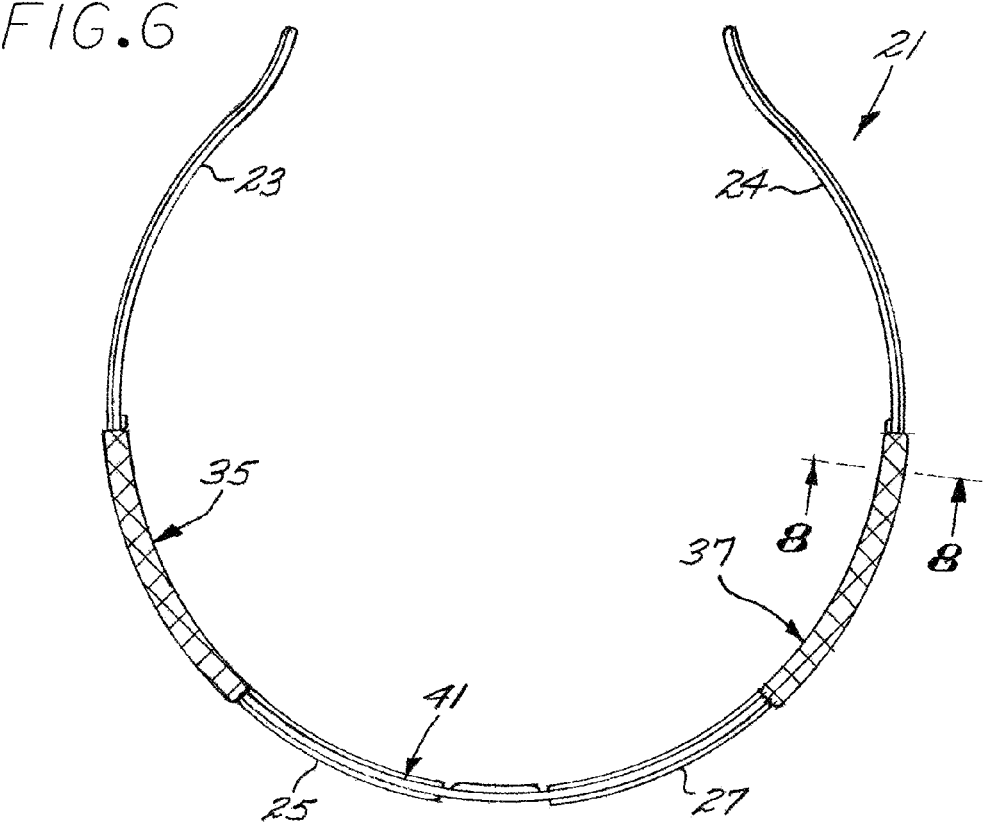

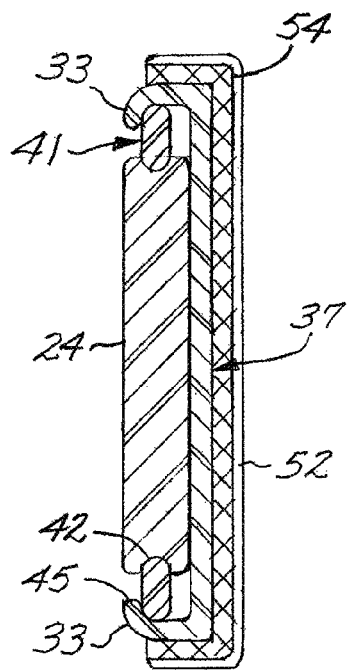
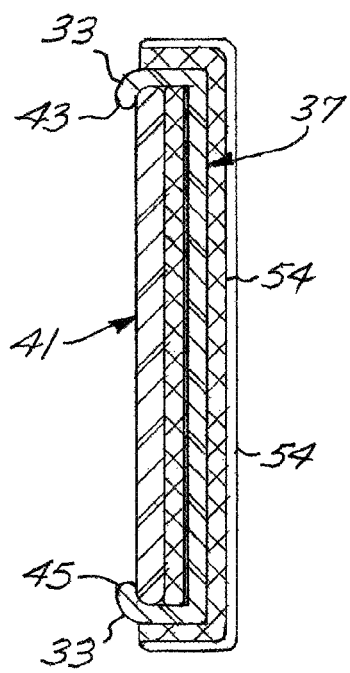
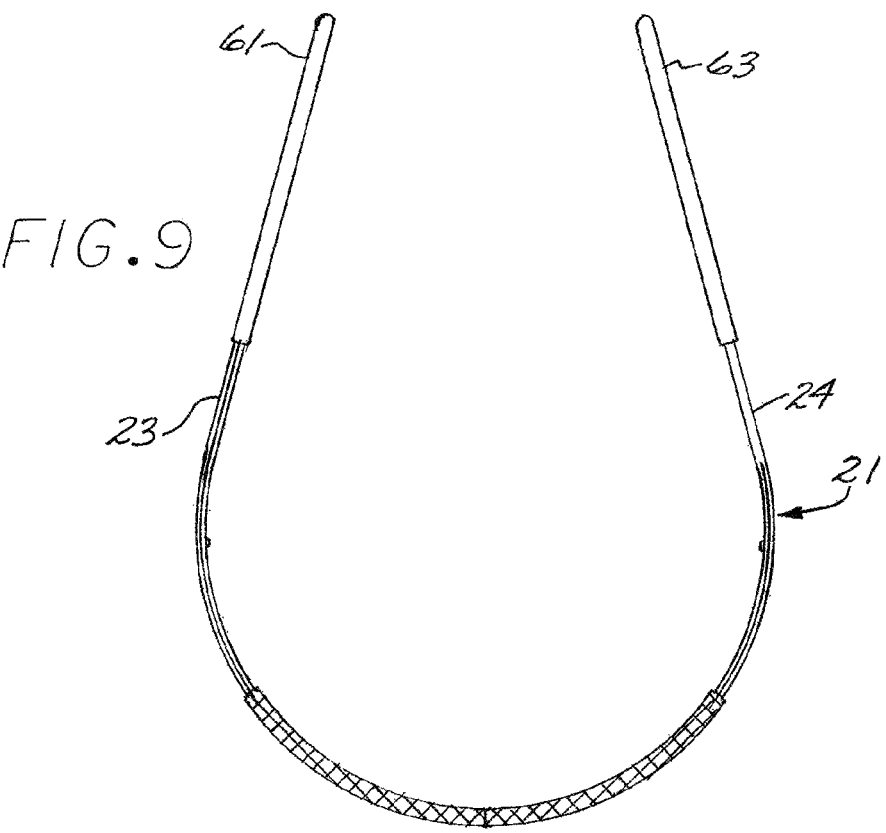

COMINATION JEWELRY PIECE WITH CAMOUFLAGED EYEGLASS MOUNT

BACKGROUND

Description of the Prior Art

Eyeglasses have been known for centuries, probably extending back to convex lenses known in about 1021. Early glasses in the 1400's incorporated convex lenses that could correct both hyperopia (far-sightedness) and the presbyopia (near-sightedness) that commonly develops as a symptom of aging. By the early 1800's lenses for correcting astigmatism were developed. Over time the construction of frames for construction of eyeglasses evolved. Early pieces were designed to be either held in place by hand or by exerting pressure on the nose (pince-nez). Modern style glasses, held by temple pieces passing over the ears, were developed some time after about 1727 and, while not immediately successful, eventually evolved into fanciful modern glasses known today, sometimes worn for fashion and style even by those not suffering from any type of presbyopia, hypermetropia or astigmatism.

Jewelry probably goes back over 100,000 years and is known as decorative items for personal adornment, such as brooches, rings, necklaces, earrings and bracelets. Jewelry is made from a wide range of materials but gemstones and similar materials such as amber and coral, precious metals, beads and shells along with braiding and other decoration have been incorporated to enhance the appearance of the jewelry piece. The use of jewelry has been proposed for functional purposes such as to fix clothing in place or in the form of watches to tell the time of day, as a mark of social status and personal status, as a signifier of some form of affiliation and/or as an artistic display. As disclosed below, there have even been some efforts to incorporate corrective optical lenses in large link beads.

A great portion of the public suffers from visual imperfection such as presbyopia and could benefit from corrective optical lenses. Many patients, and particularly younger women, are reluctant to be seen wearing traditional glasses so will seek to cope without correction. This, of course, detracts from enjoyment and performance, particularly for those whose work requires them to read text or, possibly view objects, slides and graphics spaced some distance away. The performance of many students studying in junior high school, high school, college or graduate school or the like would be enhanced by good vision, even if just for either close up or far-away objects. I have noted that, for instance, many high school women will refuse to put on corrective glasses in public out of concern that others may think less of them for wearing glasses; the proverbial "4 eyes". This can then result in the student missing much of what is displayed on a display chart or video screen thereby negatively effecting performance.

With the advent of contact lenses an option was made available to those having concern about wearing glasses. Contact lenses are, however, expensive and require considerable care for transporting and applying to the eyes, thus often discouraging use. Moreover, a certain portion of the population suffers discomfort with contact lenses thereby making those lenses an unattractive alternative.

Much consideration has been given to the fact that eyeglasses may from time to time be lost or misplaced. Numerous different devices have been proposed to be worn around the neck for suspending eyeglasses when not in use. Examples include holders tethered to the wearer's neck disclosed in US Pat. App No. 2012/0255326 to Prestwidge and U.S. Pat. No. 8,752,743 to Nazarenko. While having utility for tethering glasses, these devices suffer the shortcoming that the glasses or holders are still suspended in view as telltale evidence of restricted eyesight.

Other efforts have led to the proposal that a necklace be formed of oversized links, two of which links are to act as frames to mount lenses which may be brought up to the eyes much in the manor of monocles of times past. A necklace of this type is shown in US Pat. App. No. 2008/0231796 to Soulless. Such neckless have been proposed with little regard to aesthetics and have not gained popularity in the marketplace.

Still further concern over the misplacement of eyeglasses has led to the proposal that the frame be constructed with one piece narrow U-shaped band configured in the front with lens windows, the band being upturned at the rear. See for example, U.S. Pat. No. 7,347,544 to McLaughlin. Such devices, while serving their intended purpose, serve more to advertise the wearer's need for eyeglasses than to concealing it.

It has long been known that a certain portion of the public has a certain phobia about being seen with eyeglasses. Awareness of this phobia has lead to a proposal that jewelry be constructed with over-sized rings so that prescription lenses may be mounted in one or more of the rings to be held up to the eye in monocle fashion. A device of this type is shown in US Pat. App. No 2012/0038877 to Burns. While serving to always keep the lens at hand, such devices suffer the shortcoming that the lenses themselves are always exposed in a non-stylish manner and are subject to smudging, scratching and other optical deterioration of the lens surfaces when not in use.

Consequently, heretofore, those with impaired vision and having an aversion to being seen with glasses were left with the dilemma; either resort to the relatively expensive and inconvenient, alternative of contact lenses, if tolerable, or suffer from the impaired vision. It is this dilemma to which the present invention is directed.

SUMMARY OF THE INVENTION

A combination jewelry piece and camouflaged lens device including a resilient U-shaped decorative band configured with opposite legs to retain the device from the neck, wrist or the like of the wearer. The legs slidably mount decorative visors to be selectively slid from retracted positions to covering positions concealing the lenses.

BRIEF DESCRIPTION OF THE DRAWINGS

FIG. 4 is a side view of the device shown in FIG. 1;

FIG. 5 is a front view of the device shown in FIG. 1 with the visors retracted;

FIG. 6 is a top view of the device shown in FIG. 1 with the visors retracted;

FIG. 7 is a transverse sectional view taken along the lines 7-7 of FIG. 3;

FIG. 8 is a transverse sectional view, in enlarged scale, taken along the lines 8-8 of FIG. 6; and FIG. 9 is a top plan view of a bracelet device incorporating the present invention.

DETAILED DESCRIPTION OF THE PREFERRED EMBODIMENTS

Figure 1:
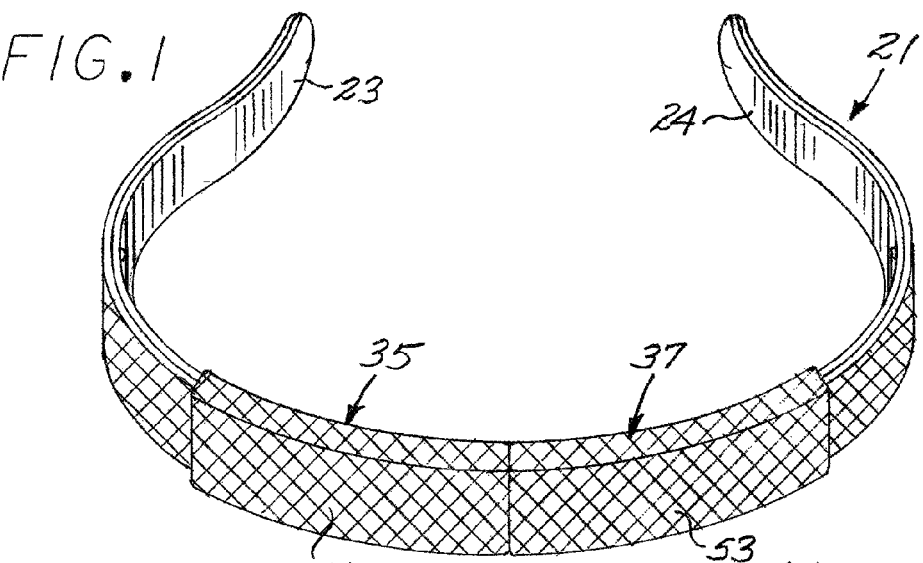
FIG. 1 is a perspective view of a combination jewelry and eyeglass device of the present invention.

The combination jewelry piece and eyeglass device of the present invention includes a resilient U-shaped band, generally designated 21, formed with opposite legs 23 and 24 and mounting lenses 25 and 27 in the closed end section 29. Mounting devices 31 and 33 carry the visors and are carried slidably from the legs to be slid from a covering position with respective visors 35 and 37 covering the lenses 25 and 27 (FIG. 1) to retraced positions as shown in FIGS. 5 and 6.

Many style conscious individuals in need of corrective vision have long suffered from the fact that it is perceived that a certain segment of society that eyeglasses denote a physical imperfection or certain aging deemed unattractive to the point where it may be perceived that social pressure discourages wearing of present day eyeglasses.

The frame 21 of the present invention may take many different shapes and configurations, it only being important that the frame incorporate a construction whereby there is sufficient resilient so the free ends of the legs 23 and 24 will serve to retain the combination on the wearer's neck or possibly on his or her head raised over the forehead in the form typical of sunglasses raised away from the eyes and to also act as eyeglass temples when the device is utilized as eyeglasses. The frame may be constructed of various different types of materials, such as, a polymer commonly known as plastic, metal or other materials well known to those skilled in the art.

The frame may take various different configurations but is typically U-shaped with the legs curving in a convergent direction toward one another to form a throat somewhat narrower than the wearer's neck but sufficiently flexible so that the legs may be flexed laterally outwardly to embrace the opposite sides of the wearer's head and, typically, of a sufficient length to extend over the ears.

In some configurations, the frame 21 is in the form of a wide band with a front section projecting across the closed end and arranged such that, when worn on the wearer's head, will place the front section in confronting relationship with the wearer's eyes. In some configurations, the front section is formed with windows receiving lenses.

Conveniently, I have constructed my exemplary embodiment such that an eyeglass frame, generally designated 41 (FIG. 5), is carried in the front section of such frame form windows 40 and 42 for receiving the respective lenses 25 and 27. The lenses 25 and 27 may be of various different constructions and different opacities, particularly, transparent for prescription lenses, often used by students for reading medium or fine print text.

Slider mounts 31 and 33 in the form of C-shaped channel clips are configured on their upper and lower extremities with respective hook members 43 and 45 which hook over the respective top and bottom edges of the necklace band 21 and configured to slide over the upper and lower extremities of the eyeglass frame 41 (FIGS. 7 and 8) to carry the respective visors 35 and 37 into place.

Figure 2:
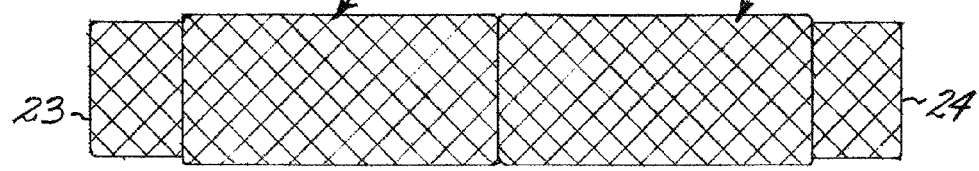
FIG. 2 is a front view thereof.
Figure 3:
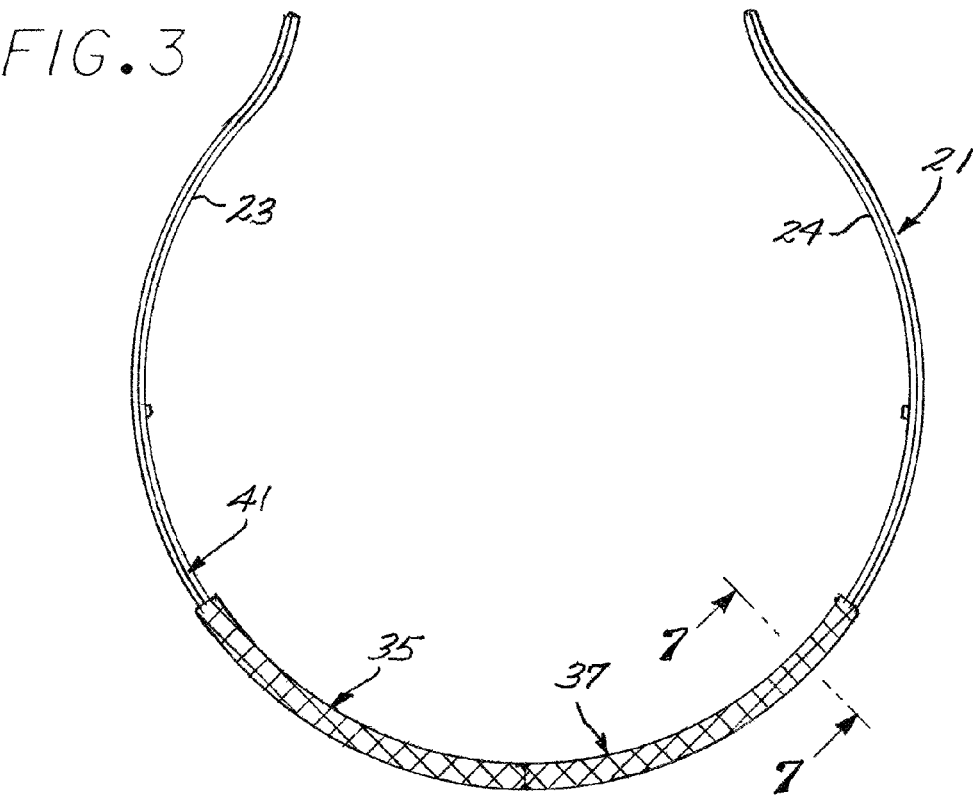
FIG. 3 is a top view of the combination jewelry and eyeglass device shown in FIG. 1.

Referring to FIGS. 1, 2 and 8, the visors 35 and 37 may take numerous different configurations, it only being important that they be constructed to be carried from the band 21 in a sliding manner so as to be slid from the closed position shown in FIGS. 1-3 to the open position shown in FIGS. 5 and 6 translated rearwardly on the respective legs 23 and 24 to un-shield the respective lenses 25 and 27.

In the exemplary embodiment, respective visors 35 and 37 are channel shaped in cross section and formed with a longitudinal arc complimenting the curvature of the frame 21 so as to accommodate sliding of the similarly curved slider mounts 33 along the curvature of the frame. In this embodiment, the slider mounts 31 and 33 are configured to form a siding frictional fit with the frame such that the visors will be held in place by friction, either in the open or closed position. In some configurations, the carrier mounts 31 and 33 are configured with tabs received releasably in respective detents formed along the length of the frame to releasably lock to visors in their respective closed positions.

The frame 24 and visors 35 and 37 include decorative elements 51 and 53 formed in exterior layers 52 and 54 on the frame 21. The decorative elements in the preferred embodiment, represented by cross hatching, is in the form of precious stones embedded therein and in a selected pattern and, the pattern in the exterior layer 53 of the visors being the same as the pattern in the surface of the frame 21. As will be appreciated by those skilled in the art, the decorative elements 51 and 53 may take many different forms, typically selected to compliment the particular style of the combined jewelry and sunglass. That is, in different embodiments, the combination device of the present invention may be configured with the frame and visors being relatively wide, of somewhat plane decorative elements, or sculptured construction to form attractive high style decoration to be worn on the wearer's forehead or over the eyes and in other configurations, the overall style is more traditional or sporty for less formal wear.

The decorative elements may be selected for continuity of design to thus effectively conceal or camouflage the fact that the device might incorporate eyeglasses and, in some instances, the decorative elements are selected to be complimentary or even somewhat contrasting with one another, it only being important that the designs are attractive and appealing to the viewer.

The decorative elements may be of relatively plain construction or might be formed with various selected surface designs such as scrolls, zigzag shapes or other decorative configurations known to those skilled in the art.

In practice, the device of the present invention may be constructed with the lenses 25 and 27 of darkened construction or even polarized to act as sunglasses, either with or without incorporating prescriptions. In other configurations, the lenses 25 and 27 are prescription and, depending on the needs of the particular wearer, and in many instances are similar to those employed in traditional "readers".

In practice, the wearer purchasing a combination jewelry and eyeglass device of the present invention will make the purchase and secure a prescription from his or her optometrist or ophthalmologist to determine the power to which these lenses should be made in order to correct any blurred vision due to refractive errors such as myopia, hyperopia, astigmatism or presbyopia.

The frames 41 of my invention are constructed so that the lenses 25 and 27 of the desired prescription may be snapped into place, thus allowing the wearer or optical professional to snap the lens of the desired prescription in place.

It is envisioned that the combination jewelry and eyeglass device of the present invention will be stocked by retail outlets in many different styles and designs. A purchaser may thus select a particular style appealing to him or her. Some devices will incorporate translucent sunglass lenses 25 and 27 so that the wearer may immediately use the device as jewelry and sunglasses. In other instances, the frame 41 will be without lenses so the user may acquire his or her frames directly from his or her healthcare specialist and insert the lenses in the respective windows 40 and 42 as desired. The device will then be available to adorn the wearer in a normal manner. For many such devices, the style, design and decorative elements will be selected of a character that is appealing to youngsters of school age. It is known that, particularly female students, are resistant to wearing eyeglasses on the thought that there is some social stigma attached. With the advent of the present invention however, the student will have the opportunity to wear the present device as attractive, smart jewelry but, when in the study hall or classroom when glasses are needed, the student can convert what was recognized before as a piece of jewelry to eyeglasses for viewing the display board or screen or, possibly for reading his or her textbook or close inspection of experiments or work That is, when the wearer arises in the morning and dons the attire for the day, he or she might select from one of several different pieces of the combination jewelry and eyeglass devices to go with the outfit to be worn, i.e. sporty, casual or formal. The device may be easily suspended from the wearer's neck by merely spreading the free ends of the legs 23 and 24 apart to extend around the neck, releasing the legs to flex back together to hold the device suspended. In the alternative, of course, the device may be worn as a barrette with the legs embraced on the opposite sides of the head and the closed end elevated up over the forehead.

In any event, when the wearer arrives in the classroom or his or her office, and desires to take advantage of the correction for his or her vision, the device may be removed from the neck or forehead and the visors 35 and 37 slid laterally away from one another as viewed in FIGS. 1 and 2 thus sliding the slider mounts devices 31 and 33 laterally outwardly on the connective legs 23 and 24 to remove such visors from covering relationship over the respective lenses 24 and 25 thereby exposing the lenses for viewing. The device may then be fitted over the wearer's eyes with the legs embracing the opposite sides of the head, typically extending back over the ears so the legs act as temples. The frame 21 would be suspended from the bridge of the nose and the wearer can proceed about his or her work and once the task is completed, the wearer may again grasp the visors 35 and 37 to draw them back toward one another thereby causing the carriers 33 to carry such visors back into confronting relationship over the respective lenses 24 and 25.

Referring to FIG. 9, the combination jewelry eyeglass device shown there is of construction similar to that shown in FIGS. 1-8 except that the frame 21 is of a smaller radius of curvature to fit over the wearers wrist. The legs 23 and 24 converge toward one another in a somewhat linear fashion and include elongated, flexible tubular temple extenders 61 and 63 telescoped over the free ends thereof to be extended, when the device is to be placed on the face, to act as a pair of eyeglasses to thereby reach rearwardly on the wearer's head to the ear area.

Thus, it will be appreciated that the means for carrying the visors 35 and 37 from the frame is in the form of the channel shaped carriers mounts 31 and 33 which embrace the frame on the top and bottom edges to hook thereover and form a sliding joint with the frame 21 and the eyeglass frames 41 so as to provide for the visors being shifted into their open or closed positions.

Although the present invention has been described in detail with regard to the preferred embodiments and drawings thereof, it should be apparent to those of ordinary skill in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention.

I claim:

1. A combination jewelry and eye glass device to be worn from a body part of a wearer as decorative jewelry and also to be worn from the wearer's head as eyeglasses comprising:
    a resilient U-shaped band configured with a closed front side having opposite lateral ends and a pair of legs projecting from the opposite ends and configured with free extremities to be spread apart to be received in retaining relationship over the body part and further, formed to be received on the opposite sides of the wearer's head to hold the front side in eye-glass-position in confronting relationship with the wearer's eyes and still further formed along their respective lengths with laterally outwardly facing surfaces
    the band configured in the front side with windows for receipt of lenses and disposed in the line of sight of the wearers eyes;
    camouflage visors formed with forwardly facing front surfaces and arranged to be moved between covering positions disposed in covering relationship covering the front of the windows and retracted positions clear of the front of the respective windows, the visors including outwardly facing front surfaces;
    mounting devices for mounting the lenses from the respective legs for shifting of the visors from the respective covering relationships to the retracted positions; and
    first and second decorative elements of respective first and second designs on the respective outwardly facing surfaces and the front surfaces to be viewed by observers when the band is in the eyeglass position, the first and second designs being complimentary.

2. A combination jewelry and eye glass device of claim 1 wherein
    the first and second designs are identical.

3. A combination jewelry and eye glass device of claim 1 wherein:
    the mounting devices are constructed to grip the respective legs in frictional relationship.

4. A combination jewelry and eye glass device of claim 1 wherein:
    the band is formed with a predetermined radius of curvature; and
    the mounting devices are elongated and formed with a radius of curvature complimenting the predetermined curvature.

5. Combination jewelry and eyeglass device to be worn from a wearer's neck comprising:
    a resilient U-shaped band constructed with a closed side and opposite legs terminating in free extremities spaced apart to from an open opening smaller than the cross section of the neck, the band formed to fit over a wearer's body part to be retained on the neck to act as a decorative jewelry piece and further being constructed to act as an eye glass frame with the legs projecting rearwardly on the opposite sides of the wearer's head to engage the opposite sides to retain the band on the wearer's head with the closed side disposed in confronting relationship over the wearer's eyes;
    lenses mounted to the closed side to be, when the band is acting as an eyeglass frame, disposed in the line of sight of the wearer's eyes;
    visors for traveling between respective covering positions over the respective lenses and respective retracted positions clear of the respective lenses; and mounting devices carrying the visors from the band for shifting of the respective visors between the covering and retracted positions.

6. Combination jewelry and eyeglass device to be worn from a wearer's wrist comprising:
a resilient U-shaped band constructed with a closed side and opposite legs terminating in free extremities spaced apart to from an open opening smaller than the cross section of the wrist, the band formed to fit over a wrist to be retained on the wrist to act as a decorative jewelry piece and further being constructed to act as an eye glass frame with the legs projecting rearwardly on the opposite sides of the wearer's head to engage the opposite sides to retain the band on the wearer's head with the closed side disposed in confronting relationship over the wearer's eyes,
lenses mounted to the closed side to be, when the band is acting as an eyeglass frame, disposed in the line of sight of the wearer's eyes;
visors for traveling between respective covering positions over the respective lenses and respective retracted positions clear of the respective lenses; and
mounting devices carrying the visors from the band for shifting of the respective visors between the covering and retracted positions.

7. Combination jewelry and eyeglass device comprising:
a resilient U-shaped band constructed with a closed side and opposite legs terminating in free extremities spaced apart to from an open opening smaller than the cross section of the body part, the band formed to fit over a wearer's body part to be retained on the body part to act as a decorative jewelry piece and further being constructed to act as an eye glass frame with the legs projecting rearwardly on the opposite sides of the wearer's head to engage the opposite sides to retain the band on the wearer's head with the closed side disposed in confronting relationship over the wearer's eyes;
lenses mounted to the closed side to be, when the band is acting as an eyeglass frame, disposed in the line of sight of the wearer's eyes;
visors for traveling between respective covering positions over the respective lenses and respective retracted positions clear of the respective lenses;
mounting devices carrying the visors from the band for shifting of the respective visors between the covering and retracted positions; and
elongated extenders carried from the free extremities of the legs and constructed to be shifted from respective retracted positions on the legs to extended positions beyond the respective free ends of the respective legs.

8. Combination jewelry and eyeglass device comprising:
a resilient U-shaped band constructed with a closed side and opposite legs terminating in free extremities spaced apart to from an open opening smaller than the cross section of the body part, the band formed to fit over a wearer's body part to be retained on the body part to act as a decorative jewelry piece and further being constructed to act as an eye glass frame with the legs projecting rearwardly on the opposite sides of the wearer's head to engage the opposite sides to retain the band on the wearer's head with the closed side disposed in confronting relationship over the wearer's eyes,
lenses mounted to the closed side to be, when the band is acting as an eyeglass frame, disposed in the line of sight of the wearer's eyes;
visors for traveling between respective covering positions over the respective lenses and respective retracted positions clear of the respective lenses; and
mounting devices friction fit over the respective legs to carry the visors from the band for shifting of the respective visors between the covering and retracted positions.

9. Combination jewelry and eyeglass device comprising:
a resilient U-shaped band constructed with a closed side and resilient opposite legs curving distally toward one another to be spaced apart to from an open opening smaller than the cross section of the body part and further formed with free extremities which flare distally and outwardly away from one another, the band further formed to fit over a wearer's body part to be retained on the body part to act as a decorative jewelry piece and further being constructed to act as an eye glass frame with the legs projecting rearwardly on the opposite sides of the wearer's head to engage the opposite sides to retain the band on the wearer's head with the closed side disposed in confronting relationship over the wearer's eyes;
lenses mounted to the closed side to be, when the band is acting as an eyeglass frame, disposed in the line of sight of the wearer's eyes;
visors for traveling between respective covering positions over the respective lenses and respective retracted positions clear of the respective lenses; and
mounting devices carrying the visors from the band for shifting of the respective visors between the covering and retracted positions.

10. Combination jewelry and eyeglass device comprising:
a resilient U-shaped band constructed with a closed side and opposite resilient legs constructed to, in their relaxed condition, converge toward one another and terminating in free extremities spaced apart to from an open opening smaller than the cross section of the body part, the band formed to fit over a wearer's body part to be retained on the body part to act as a decorative jewelry piece and further being constructed to act as an eye glass frame with the legs projecting rearwardly on the opposite sides of the wearer's head to engage the opposite sides to retain the band on the wearer's head with the closed side disposed in confronting relationship over the wearer's eyes;
lenses mounted to the closed side to be, when the band is acting as an eyeglass frame, disposed in the line of sight of the wearer's eyes;
visors for traveling between respective covering positions over the respective lenses and respective retracted positions clear of the respective lenses; and
mounting devices carrying the visors from the band for shifting of the respective visors between the covering and retracted positions.

11. The combination jewelry and eyeglass device of claim 10 wherein:
the mounting devices are constructed to slide along the band to carry the visors from the respective covering to the retracted positions.

12. The combination jewelry and eyeglass device of claim 10 that includes:
decorative jewelry components on the band and on the visors.

13. The combination jewelry and eyeglass device of claim 10 wherein:
the band is formed in the closed side with a pair of spaced apart windows; and
the lenses are mounted in the windows.

14. The combination jewelry and eyeglass device of claim 10 wherein:
   the legs are arcuate.

15. The combination jewelry and eyeglass device of claim 10 for use with a wearer's head and:
   the band is constructed with the free ends of the legs to be, in their relaxed position, spaced apart less than the width of the wearer's head whereby the legs may be drawn apart to be received on the head and to, when relaxed, embrace the head with sufficient force to be held in place with the closed side raised over the wearer's forehead.

16. The combination jewelry and eyeglass device of claim 10 wherein:
   the band includes precious metal.

17. The combination jewelry and eyeglass device of claim 10 wherein;
   the lenses are prescription lenses.

18. The combination jewelry and eyeglass device of claim 10 wherein:
   the lenses are dark colored to form sunglass lenses.

* * * * *